(12) United States Patent
Veeder

(10) Patent No.: US 7,928,355 B2
(45) Date of Patent: Apr. 19, 2011

(54) CURRENT SUBTRACTION PIXEL

(75) Inventor: Kenton Veeder, Winthrop, MA (US)

(73) Assignee: SiOnyx, Inc., Beverly, MA (US)

( * ) Notice: Subject to any disclaimer, the term of this patent is extended or adjusted under 35 U.S.C. 154(b) by 60 days.

(21) Appl. No.: 12/392,692

(22) Filed: Feb. 25, 2009

(65) Prior Publication Data

US 2010/0213352 A1     Aug. 26, 2010

(51) Int. Cl.
*G01J 1/44* (2006.01)
(52) U.S. Cl. .............. 250/214 C; 250/214 AG; 330/308
(58) Field of Classification Search .............. 250/214 C, 250/214 AG; 330/308
See application file for complete search history.

(56) References Cited

U.S. PATENT DOCUMENTS

| | | | |
|---|---|---|---|
| 4,201,450 A | 5/1980 | Trapani | |
| 4,277,793 A | 7/1981 | Webb | |
| 4,965,784 A | 10/1990 | Land et al. | |
| 5,773,820 A | 6/1998 | Osajda et al. | |
| 6,803,555 B1 * | 10/2004 | Parrish et al. ............. | 250/214 C |
| 7,057,256 B2 | 6/2006 | Carey, III et al. | |
| 7,354,792 B2 | 4/2008 | Carey, III et al. | |
| 7,390,689 B2 | 6/2008 | Mazur et al. | |
| 7,442,629 B2 | 10/2008 | Mazur et al. | |
| 2006/0231914 A1 | 10/2006 | Carey, III et al. | |
| 2008/0258604 A1 | 10/2008 | Mazur et al. | |
| 2008/0266435 A1 | 10/2008 | Agranov et al. | |

FOREIGN PATENT DOCUMENTS

WO    2008091242 A2    7/2008

OTHER PUBLICATIONS

Chien et al, "Pulse Width Effect in Ultrafast Laser Processing of Materials," Applied Physics A, 2005, 1257-1263, 81, Springer Berlin, Heidelberg, Germany.
Nayak et al, "Semiconductor Laesr Crystallization of a-Si:H," SPIE Digital Library, 2003, 277-380, vol. 4977, Bellingham, Washington.
Nayak et al, "Semiconductor Laser Crystallization of a-Si:H on Conducting Tin-Oxide-Coated Glass for Solar Cell and Display Applications," Applied Physics A, 2005, 1077-1080, 80, Springer Berlin, Heidelberg, Germany.
Nayak et al, "Ultrafast-Laser-Assisted Chemical Restructuring of Silicon and Germanium Surfaces," Applied Surface Science, 2007, 6580-6583, vol. 253, Issue 15, Elsevier B.V.
Nayak et al, "Ultrafast Laser Textured Silicon Solar Cells," Mater. Res. Soc. Symp. Proc., 2009, vol. 1123, Materials Research Society.
Zhang et al, "Ultra-Shallow P+-Junction Formation in Silicon by Excimer Laser Doping: a Heat and Mass Transfer Perspective," Int. J. Heat Mass Transfer, 1996, 3835-3844, vol. 39, No. 18, Elsevier Science Ltd., Great Britain.

(Continued)

*Primary Examiner* — Seung C Sohn
(74) *Attorney, Agent, or Firm* — Pepper Hamilton LLP

(57) ABSTRACT

A pixel for detecting at least a portion of the electromagnetic spectrum may be provided. The pixel includes a detector element for detecting at least a portion of the electromagnetic spectrum, a bias point coupled to an output of the detector element for applying a biasing voltage to the detector element and capable of affecting the electrical output of the first detector element, an interface-trap charge pump coupled to the output of the bias point for charge pumping current from the detector, a collection point coupled to the output of the bias point for accumulating an electrical output of the detector element, and an output point for providing an electrical output of the pixel.

13 Claims, 1 Drawing Sheet

OTHER PUBLICATIONS

Figure 1:
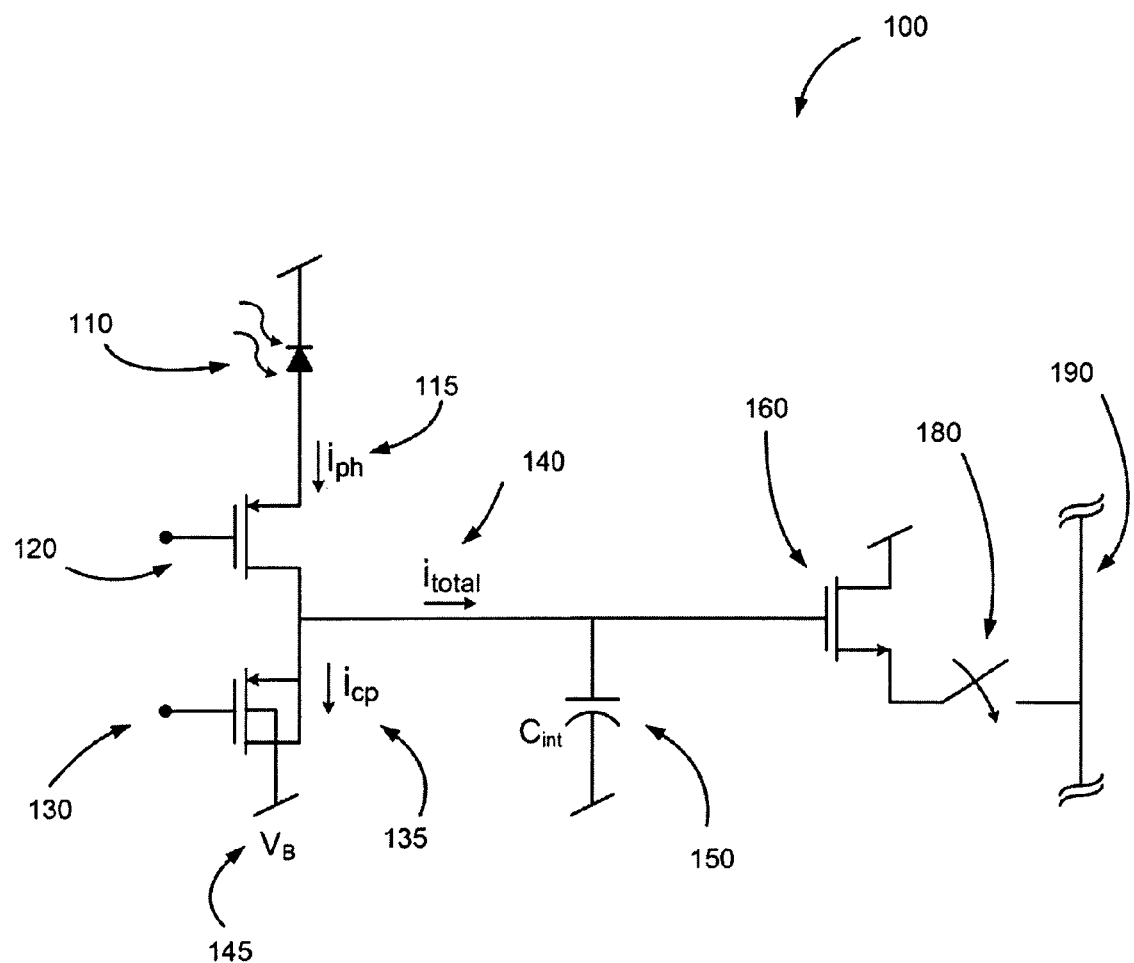

Carey, et al., "Fabrication of Micrometer-Sized Conical Field Emitters Using Femtosecond Laser-Assisted Etching of Silicon," Proc. IVMC 2001, 75-76, UC Davis, Davis, CA.

Carey, et al., "Field Emission from Silicon. Microstructures Formed by Femtosecond Laser Assisted Etching," Proc. CLEO 2001 (Baltimore, MD 2001) 555-557.

Carey, et al. "Femtosecond Laser-Assisted Microstructuring Of Silicon For Novel Detector, Sensing And Display Technologies", LEOS 2002, 97-98, Glasgow, Scotland.

Carey, et al., "High Sensitivity Silicon-Based VIS/NIR Photodetectors", Optical Society of America (2003) 1-2.

Carey, et al. "Femtosecond Laser-Assisted Microstructuring of Silicon For Novel Detector, Sensing And Display Technologies", LEOS 2003, 481-482, Tuscan, AR.

Carey et al., "Femtosecond-Laser-Assisted Microstructuring of Silicon Surfaces", Optics and Photonics News, 2003. 14, 32-36.

çilingiroğlu, et al., "An Evaluation of MOS Interface-Trap Charge Pump as an Ultralow Constant-Current Generator," IEEE Journal of Solid-State Circuits, 2003, vol. 38, No. 1, Jan. 2003, 71-83.

Crouch et al., "Infrared Absorption By Sulfur-Doped Silicon Formed by Femtosecond Laser Irradiation", Appl. Phys. A, 2004, 79, 1635-1641.

Crouch et al., "Comparison Of Structure and Properties Of Femtosecond And Nanosecond Laser-Structured Silicon" Appl. Phys. Lett., 2004, 84,1850-1852.

Dolgaev et al., "Formation Of Conical Microstructures Upon Laser Evaporation Of Solids", Appl. Phys. A, 2001, 73, 177-181.

Fowlkes et al., "Surface Microstructuring And Long-Range Ordering Of Silicon Nanoparticles", Appl. Phys. Lett., 2002, 80 (20), 3799-3801.

Han, et al., "Evaluation of a Small Negative Transfer Gate Bias on the Performance of 4T CMOS Image Sensor Pixels," 2007 International Image Sensor Workshop, 238-240, Ogunquit, Maine.

Her et al., "Novel Conical Mcrostructures Created In Silicon With Femtosecond Laser Pulses", CLEO 1998, 511-512, San Francisco, CA.

Her et al., "Microstructuring of Silicon with Femtosecond Laser Pulses," Applied Physics Letters, 1998, 1673-1675, vol. 73, No. 12, American Institute of Physics.

Her, et al., "Femtosecond laser-induced formation of spikes on silicon," Applied Physics A, 2000, 70, 383-385.

Hsieh, et al., "Focal-Plane-Arrays and CMOS Readout Techniques of Infrared Imaging Systems," IEEE Transactions on Circuits and Systems for Video Technology, 1997, vol. 7, No. 4, Aug. 1997, 594-605.

Hu et al., "Solar Cells from Basic to Advanced Systems," McGraw Hill Book Co., 1983, 39, New York, New York.

Pedraza et al., "Surface Nanostructuring Of Silicon", Appl. Phys. A, 2003, 77, 277-284.

Pedraza et al., "Silicon Microcolumn Arrays Grown By Nanosecond Pulsed-Excimer Laser Irradiation", Appl. Phys. Lett., 1999, 74 (16), 2322-2324, American Institute of Physics.

Sanchez et al., "Dynamics Of The Hydrodynamical Growth Of Columns On Silicon Exposed To ArF Excimer-Laser Irradiation", Appl. Phys. A, 1998, 66, 83-86.

Sanchez et al., "Whiskerlike Structure Growth on Silicon Exposed To ArF Excimer Laser Irradiation", Appl. Phys. Lett., 1996, 69 (5), 620-622.

Serpengüzel et al., "Temperature Dependence Of Photluminescence In Non-Crystalline Silicon", Photonics West (San Jose, CA, 2004) 454-462.

Shen et al., "Formation Of Regular Arrays Of Silicon Micorspikes by Femotsecond Laser Irradiation Through A Mask", Appl. Phys. Lett., 82, 1715-1717 (2003).

Solar Energy Research Institute, "Basic Photovoltaic Principles and Methods," Van Nostrand Reinhold Co., NY 1984, pp. 45-47 and 138-142.

Uehara et al., "A High-Sensitive Digital Photosensor Using MOS Interface-Trap Charge Pumping," IEICE Electronics Express, 2004, vol. 1, No. 18, 556-561.

Wu et al., "Black Silicon: A New Light Absorber," APS Centennial Meeting (Mar. 23, 1999).

Wu et al., "Femtosecond laser-gas-solid interactions," Thesis presented to the Department of Physics at Harvard University, pp. 1-113, 126-136, Aug. 2000.

Wu et al., "Visible Luminescence From Silicon Surfaces Mcrostructured in Air". Appl. Phys. Lett., vol. 81, No. 11, 1999-2001 (2002).

Younkin, "Surface Studies and Microstructure Fabrication Using Femtosecond Laser Pulses," Thesis presented to the Division of Engineering & Applied sciences at Harvard University (Aug. 2001).

Younkin et al., "Infrared Absorption By Conical Silicon Microstructures Made In A Variety Of Background Gases Using Femtosecond-Laser Pulses", J. Appl. Phys., 93, 2626-2629 (2003).

* cited by examiner

CURRENT SUBTRACTION PIXEL

I. TECHNICAL FIELD

The present disclosure relates to the detection of electromagnetic radiation, and more particularly, to methods and articles for subtracting out excess current in high current photodetectors.

II. BACKGROUND

Pixels, or "picture elements," are the basic light- or color-detection and display elements that form a digital image. Typical digital video and imaging systems use a collection of detector pixels to capture a two-dimensional image field at a capture end (such as a camera) and another corresponding collection of display pixels to display the corresponding two-dimensional image at a display end (such as a monitor). In digital imaging systems, an array of light-sensitive pixels, each including a light sensor or detector, respond to an intensity of incident light at each pixel location, providing an electrical output representative of the incident light. The output of an imager can be referred to as an image.

Motion or video cameras repeat the process described above, but permit a time-sequence to be captured, for example at regular intervals, so that the captured images can be replayed to recreate a dynamic scene or sequence.

Most film and digital pixel imagers include wavelength-specific sensors or detectors. The chemical composition of the film or the design of the digital pixels and associated filters determines the range of wavelengths of light to which the film or pixels respond. Practically, a detector or imager has a frequency response that is optimized to provide images of light in the range of wavelengths the imager is designed for. The most common examples are sensitive to visible light (e.g., red, green, blue, and combinations thereof). Visible light corresponds to the range of wavelengths of electromagnetic radiation to which our eyes are sensitive, and is generally in the range of 400 to 750 nanometers (nm).

Special film and digital pixel imagers are designed for low-light operation to provide night vision capability for military, security, or other special applications in which an illumination source is not available to cause a visible light image. Low-light or night vision imagers rely on detecting and imaging frequencies below (wavelengths longer than) the visible (red) wavelengths, and are sometimes called infra-red (IR) detectors. IR detection is more suited for picking up heat emissions from objects such as a person's body or a vehicle. IR radiation itself can be roughly divided into sub-spectra including the near-infra-red (NIR) having wavelengths between about 750 to 1100 nm, short-wave-infra-red (SWIR) having wavelengths between about 1100 and 2500 nm, medium-wave-infra-red (MWIR) having wavelengths between about 2500 and 8000 nm, and long-wave-infra-red (LWIR) having wavelengths between about 8000 and 12000 nm. These ranges are defined somewhat arbitrarily, and are given merely for simplifying the following discussion, and those skilled in the art will appreciate the generality of the discussion as it relates to the bands of wavelengths of the electromagnetic spectrum.

Present visible light imaging cameras have used silicon devices made with CID, CCD, or CMOS APS architectures. The low cost and efficient collection of photons from 400-750 nm wavelengths has enabled silicon devices. Present low-light or night vision IR imagers are usually less sensitive than would be desired, lack color definition, and have limited frequency response. Also, low-light imagers can be more costly, noisy, and require greater circuit resources than visible light imagers to achieve useful gains in low-signal conditions. Furthermore, IR sensors are larger than would be desired for compact portable applications because most IR sensitive materials must be cooled significantly to achieve good performance. Most long-wavelengths tend to have higher dark currents at a particular temperature. IR image sensors offer one example of sensors with higher dark currents as compared to the previously mentioned visible light detectors.

Generally, the signal output of an imaging pixel can be increased by increasing the integration time, and long integration times are generally used for low-light-level operation. However, this approach is ultimately limited by dark current leakage that is integrated along with the photocurrent. One of the problems associated with high dark current photodetectors is the limit on well capacity. A significant portion of the charge collection well can be filled just with the dark current, which reduces the over-all dynamic range by cutting in to the maximum signal that can be collected. As the dark current fills the device well, there is less room for the photoelectrons and the dark current can saturate the well. One method to reduce dark current is to cool the imaging device. Other methods to reduce dark current include using "pinning implants" in photogate or photodiode pixels and post processing algorithms which may sample the imaging device with a closed shutter to subtract dark current offset. Often some of these techniques may be used in conjunction to remove dark current offset and improve image quality.

Many detectors also suffer from a high background signal. This is especially the case in IR image sensors where the desired image object does not have a large thermal gradient with respect to the background. The high background signal produces a current offset that is similar to dark current.

In summary, present imaging sensors and pixels do not sufficiently remove dark current or background offset current for certain applications and improved pixel architecture is needed for such detectors.

III. SUMMARY

From the discussion given above it can be appreciated that better detectors capable of removing dark current are desirable. The following discussion provides such improved pixel architecture for removing dark current. Embodiments hereof provide silicon-based imagers and pixel architectures capable of removing known amounts of excess current from the system over a wide operating range and capable of providing a soft reset of the imaging pixel.

Additionally, the present embodiments provide compact, thin designs that offer increased sensitivity and resolution at a lower cost than presently available systems. Embodiments hereof provide improved manufacturing and process handling capability for producing the detectors and for implementing readout circuits associated therewith.

In general, in an aspect, a pixel for detecting at least a portion of the electromagnetic spectrum may be provided. The pixel includes a detector element for detecting at least a portion of the electromagnetic spectrum, a bias point coupled to an output of the detector element for applying a biasing voltage to the detector element and capable of affecting the electrical output of the first detector element, an interface-trap charge pump coupled to the output of the bias point for charge pumping current from the detector, a collection point coupled to the output of the bias point for accumulating an electrical output of the detector element, and an output point for providing an electrical output of the pixel.

Implementations of the pixel may include one or more of the following features. The detector element comprises a laser-treated detector portion. The interface-trap charge pump further comprises a soft reset function coupled to the collection point. The pixel further comprising readout circuitry including addressing switch points for addressing the pixel. The readout circuitry constructed and arranged along with the detector element in a monolithic semiconductor structure. The collection point comprising a capacitor which collects an electrical charge from the detector element. The bias point constructed and arranged to receive a bias voltage and coupled to the detector element to control the electrical output of the detector element. The bias point providing a reverse bias voltage constructed and arranged to substantially shut off said first electrical output of the detector element.

In general, in another aspect, a method for subtracting a known amount of current from a pixel may be provided. The method includes providing a interface-trap charge pump including a gate coupled to an output of a detector element, the detector element producing a photon current when struck by photons, providing a periodic voltage pulse signal to the gate of the interface-trap charge pump to drive the interface-trap charge pump between accumulation and inversion to create a charge pump current, and subtracting the charge pump current from the photon current.

Implementations of the method may include one or more of the following features. The charge pump current is dumped to a voltage bias that is set high with respect to an integration voltage during an integration time of the pixel. The periodic voltage pulse signal is provided at a frequency that is substantially higher than the inverse of the integration time of the pixel. The charge pump current is dumped to a voltage bias that is set low with respect to an integration voltage during an integration time of the pixel. The interface-trap charge pump comprises a NMOS charge pump.

Other embodiments and uses for the methods and systems given herein can be developed by those skilled in the art upon comprehending the present disclosure.

IV. BRIEF DESCRIPTION OF THE DRAWINGS

For a fuller understanding of the nature and advantages of the present invention, reference is made to the following detailed description of preferred embodiments and in connection with the accompanying drawing, in which:

FIG. 1 illustrates an exemplary pixel including an interface trap charge pump element.

V. DETAILED DESCRIPTION

The present disclosure describes systems and articles of manufacture for providing a pixel for use with high current photodetectors which subtract out excess current using an interface-trap charge pump and methods for making and using the same. These methods and apparatus are useful in many applications, including applications benefiting from imaging in a variety of light conditions. The methods and apparatus disclosed herein are useful in applications with high leakage current detectors and for traditional detectors used in high background offset situations. In some embodiments the detectors and techniques provided herein can be adapted to small, inexpensive, low-power, portable applications such as hand-carried helmet-mounted and similar applications.

Some or all embodiments hereof include a sensor or detector sensitive to certain electromagnetic wavelengths and formed into a device on a semiconductor substrate. In some embodiments, the detector includes a portion comprising a semiconductor material, for example silicon, which is irradiated by a short pulse laser to create modified micro-structured surface morphology. The laser processing can be the same or similar to that described in U.S. Pat. No. 7,057,256 to Carey et al., which is hereby incorporated by reference. The laser-processed semiconductor is made to have advantageous light-absorbing properties. In some cases this type of material has been called "black silicon" due to its visually darkened appearance after the laser processing and because of its enhanced absorption of light and IR radiation compared to other forms of silicon.

We now turn to a description of an exemplary apparatus for detecting electromagnetic radiation or light in at least a range of wavelengths of the electromagnetic spectrum and which can remove known amounts of current prior to a collection point.

FIG. 1 illustrates an exemplary pixel 100 comprising a photonic detector 110 of the laser-treated type described above (sometimes referred to as 'black silicon' detector). Although a laser-treated detector 110 is included in present embodiment, in other embodiments, non laser-treated photonic detectors may be used. The pixel 100 further comprises a direct injection bias MOSFET 120, an interface-trap charge pump 130, an integration capacitor 150, a signal buffer 160, a row enable switch 180, and a column 190.

Radiation in certain wavelength ranges incident on pixel 100 is detected by detector 110 and creates a corresponding current $i_{ph}$ 115, which represents an electrical output, to flow from the detector 110. A direct injection bias is applied by the direct injection bias MOSFET 120 to hold a relatively constant voltage across the detector 110. The direct injection bias MOSFET 120 represents a bias point and is coupled to the output of the detector 110.

The interface-trap charge pump 130 is coupled to the output of the direct injection bias MOSFET 120 and creates a corresponding charge pump current $i_{cp}$ 135. In some embodiments, the gate of the interface-trap charge pump 130 can be switched on and off to drive the channel of the interface-trap charge pump 130 between accumulation and inversion. This action fills and then empties traps in a discrete manner to create the charge pump current $i_{cp}$ 135 which can be defined as;

$$i_{cp} = q A N_{it} f,$$

where q is the electron charge, A is the MOSFET gate area, $N_{it}$ is the interface trap density per unit gate area (traps/cm$^2$), and f is the frequency of the pulse driving the gate between accumulation and inversion.

The integration capacitance provided by the integration capacitor $C_{int}$ 150, which may be physical or parasitic and represents a collection point, integrates the charge collected by flow of total current $i_{total}$ 140 through the capacitor 150 over some time. Note that in this embodiment, the total current $i_{total}$ 140 is equal to the detector current $i_{ph}$ 115 minus the charge pump current $i_{cp}$ 135. One skilled in the art will understand that the collection point provided by the integration capacitor $C_{int}$ 150 may also be referred to as an integration node, and the integration node will have corresponding voltage and current values that may vary with respect to time.

The charge pump current $i_{cp}$ 135 is subtracted from the detector current $i_{ph}$ 115. The resultant total signal current $i_{total}$ 140, is collected on the integration capacitor 150, as shown in FIG. 1. The charge pump current $i_{cp}$ 135 can be dumped to a voltage bias $V_B$ 145, that is set high with respect to the integration voltage at the integration capacitor 150 during integration to ensure no forward-biased diode current is removed from the integration node at the integration capacitor 150.

In some embodiments, an NMOS direct injection FET and an NMOS interface-trap charge pump may be used in the pixel 100 in place of the direct injection bias MOSFET 120 and interface-trap charge pump 130 respectively. In the embodiments where an NMOS direct injection FET and an NMOS interface-trap charge pump are used, the charge pump current would be dumped to a voltage bias set low with respect to the integration voltage. In the NMOS embodiment, the detector has the opposite polarity than the detector shown in FIG. 1.

The charge pump current $I_{cp}$ 135 is directly proportional to the frequency of the waveform driving the gate of the interface-trap charge pump 130 MOSFET. In some embodiments, the driving frequency of the gate of the interface-trap charge pump 130 may be significantly higher than the inverse of the integration time to prevent the operation from turning into a simple step change in the integrated signal, which is often not useful as a continuous compensator for high background flux or dark current. The direct injection bias MOSFET 120 shields the detector 110 from charge injection/ripple of the interface-trap charge pump 130 by holding the detector node voltage relatively constant with respect to the integration node.

During reset of the pixel 100, the voltage bias $V_B$ 145 can be dropped to a low value and used to reset the integration node at the integration capacitor 150. A reset process step effectively shorts out the integration capacitor 150 thus resetting the image collection process. During normal operation detector 110 is reverse biased by the bias voltage applied to direct injection bias MOSFET 120 as mentioned above. In some embodiments, a photoresistor may used in place of the photodiode that comprises the detector 110. A photoresistor is a sensor whose resistance varies with light intensity and hence in those embodiments including a photoresistor, there is no reverse bias needed. The photoresistor may still require some bias voltage with respect to the direct injection bias, but it is not a reverse bias.

This reset method will reduce the reset noise power by approximately half. This reset method, called a soft reset, will also result in a small amount of residual charge left on the integration capacitor 150, causing image lag. If the removal of this image lag is desired in a particular embodiment, a reset switch can be used to provide a hard reset to the integration node at the integration capacitor 150 to remove substantially all charge from the integration node. A follow-on drop in the voltage bias $V_B$ 145 after a hard reset will still provide the noise power reduction described above without any problems with image lag. This may be described as a hard-to-soft reset.

The charge pump current $i_{cp}$ 135 can be proportional to the number of utilized fast states under the interface-trap charge pump 130 MOSFET gate area. Modern MOSFET processes have been engineered to have very few of these states below the gates because they contribute to over-all MOSFET noise, channel mobility reduction, and leakage current. In some instances, low numbers of states may be a problem for charge pump current $i_{cp}$ 135 matching and uniformity of the resultant total signal current $i_{total}$ 140. In some embodiments, in order to have a well matched interface-trap charge pump 130, some additional states may need to be created under the gates of the interface-trap charge pump 130 MOSFETs. This can be done in numerous ways, such as through channel surface damage before the gate is deposited and lattice stress caused by thermally mismatched materials over the gate (e.g. aluminum deposited over the polysilicon gate).

A resultant output voltage is provided at the input of signal buffer 160, which represents an output point. Signal buffer 160 can be addressed by row enable switch 180 which connects to the column 190 for non-destructive reading of pixel 100. It should be appreciated that a source follower buffer, row switch, and column line are merely examples of a generally-realizable output port, which here includes circuit elements 160, 180, and 190 only by way of example.

The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure. The claims are intended to cover such modifications.

I claim:

1. A pixel for detecting at least a portion of the electromagnetic spectrum, comprising:
   a detector element for detecting at least a portion of the electromagnetic spectrum;
   a bias point coupled to an output of the detector element for applying a biasing voltage to the detector element and capable of affecting the electrical output of the first detector element;
   an interface-trap charge pump coupled to the output of the bias point for charge pumping current from the detector;
   a collection point coupled to the output of the bias point for accumulating an electrical output of the detector element; and
   an output point for providing an electrical output of the pixel.

2. The pixel of claim 1, wherein the detector element comprises a laser-treated detector portion.

3. The pixel of claim 1, wherein the interface-trap charge pump further comprises a soft reset function coupled to the collection point.

4. The pixel of claim 1, further comprising readout circuitry including addressing switch points for addressing the pixel.

5. The pixel of claim 4, wherein the readout circuitry is constructed and arranged along with the detector element in a monolithic semiconductor structure.

6. The pixel of claim 1, wherein the collection point comprises a capacitor which collects an electrical charge from the detector element.

7. The pixel of claim 1, wherein the bias point is constructed and arranged to receive a bias voltage and coupled to the detector element to control the electrical output of the detector element.

8. The pixel of claim 7, wherein the bias point provides a reverse bias voltage constructed and arranged to substantially shut off said first electrical output of the detector element.

9. A method for subtracting a known amount of current from a pixel comprising:
   providing a interface-trap charge pump including a gate coupled to an output of a detector element, the detector element producing a photon current when struck by photons;
   providing a periodic voltage pulse signal to the gate of the interface-trap charge pump to drive the interface-trap charge pump between accumulation and inversion to create a charge pump current; and
   subtracting the charge pump current from the photon current.

10. The method of claim 9 wherein the charge pump current is dumped to a voltage bias that is set high with respect to an integration voltage during an integration time of the pixel.

11. The method of claim 10 wherein the periodic voltage pulse signal is provided at a frequency that is substantially higher than the inverse of the integration time of the pixel.

12. The method of claim 9 wherein the charge pump current is dumped to a voltage bias that is set low with respect to an integration voltage during an integration time of the pixel.

13. The method of claim 12 wherein the interface-trap charge pump comprises a NMOS charge pump.

* * * * *